Aug. 1, 1961 E. M. ROSCHKE 2,994,739

SUBSCRIPTION TELEVISION RECEIVER AND METHOD OF OPERATING THE SAME

Filed April 13, 1955 3 Sheets-Sheet 1

ERWIN M. ROSCHKE
INVENTOR.

BY Francis W. Crotty

HIS ATTORNEY.

ERWIN M. ROSCHKE
*INVENTOR.*
BY Francis W. Crotty
HIS ATTORNEY.

ERWIN M. ROSCHKE
*INVENTOR.*
BY Francis W. Crotty
HIS ATTORNEY.

2,994,739

SUBSCRIPTION TELEVISION RECEIVER AND METHOD OF OPERATING THE SAME

Erwin M. Roschke, Des Plaines, Ill., assignor to Zenith Radio Corporation, a corporation of Delaware Filed Apr. 13, 1955, Ser. No. 501,104
9 Claims. (Cl. 178—5.1)

This invention relates, in general, to a subscription television transmitter and/or receiver for translating a television signal coded in accordance with a predetermined code schedule. More particularly, it pertains to a subscription television system and method of operating the same for visually displaying at a receiver, at least during selected operating intervals, decoding information contained in the television signal, related to the code schedule employed for the particular telecast, and necessary for the decoding of the received signal.

Subscription television systems have already been proposed wherein the television signal is coded in accordance with a selected coding schedule at the transmitter, and a key or coding signal indicative of the coding schedule is transmitted to subscriber receivers as a modulation component of the television signal itself or over any other suitable air channel. Systems of this general type are disclosed and claimed, for example, in copending applications Serial No. 281,418, filed April 9, 1952, and issued July 15, 1958, as Patent 2,843,656, in the name of George V. Morris et al.; Serial No. 310,309, filed September 18, 1952, in the name of Alexander Ellett; Serial No. 326,107, filed December 15, 1952, and issued February 11, 1958, as Patent 2,823,252, in the name of Jack E. Bridges; and Serial No. 370,174, filed July 24, 1953, and issued October 27, 1959, as Patent 2,910,526 in the name of Walter S. Druz, all of which are assigned to the present assignee.

For maximum secrecy it is desirable that the air-borne coding signal—which may be picked up by anyone—be related to but not a direct manifestation of the decoding pattern. It may be said to have been coded itself and requires reading or interpretation before it can be used for decoding. The reading or interpretation of the air code signal may be accomplished with a switching mechanism having a plurality of adjustable members, the relative adjustment of which determines the manner in which the coding signal actuates decoding apparatus at the receiver. The switching mechanism is preferably individualized to each subscriber's receiver in that the switch setting required to permit one receiver to decode a given program is specifically different from the setting required for the mechanism employed in any other subscriber's receiver for the same program. Unless the precise adjustment for a subscriber's individualized switching mechanism is known, proper decoding is virtually impossible. The switch setting information may be conveyed to a subscriber from the subscription television exchange in any of a number of ways, as for example, verbally over a telephone link or by mail, and affords a convenient measure of the charge assessed to subscribers.

Coding techniques of this type are attractive since they permit the use of an air-borne code signal while preserving an adequate degree of secrecy. However, it may be desired to improve the secrecy aspects of such systems. Briefly, in a system embodying the receiver of the present invention, the complete switch setting information for any given program is not distributed prior to the commencement of that program. Instead, only a part of the information is conveyed through the mails, vending machines, etc., prior to the program time and another necessary part is withheld until the beginning of the program. A subscriber must therefore be apprised of both segments of decoding information before he can set up his switching mechanism properly to achieve decoding. By holding back the second segment of information until the beginning of the program, the security aspects of the overall system are increased considerably in that it becomes materially more difficult for an unauthorized subscriber to arrive at the correct setting for his own decoder by even the most sophisticated cryptographic techniques.

The second essential part of the decoding information is made available to the subscriber, in the illustrated embodiment of the invention, by adding it to the composite video signal at the transmitter during selected portions of the frame intervals that represent a peripheral area of an image frame, for example, in the margin on one side. The other portions of the frame intervals contain the coded or scrambled video information. The sweep circuits of the receiver are normally adjusted to oversweep the picture tube and produce a raster that displays only the video information. In order for the subscriber to see the necessary supplementing switch setting or decoding information, he operates a control switch which decreases the horizontal sweep to reveal this information in the margin of the image area. He is then able to adjust his decoding apparatus in accordance with this revealed, additional information and decode or unscramble the coded video information. Thereafter, the control switch is returned to its original position to effect normal oversweeping of the picture tube and present a display of the decoded or unscrambled video to the exclusion of the supplemental decoding information.

It is, accordingly, an object of the present invention to provide an improved system for distributing decoding information in a subscription television service.

It is a further object of the invention to provide a novel method of operating a subscription television receiver.

It is another object of the invention to provide an improved television receiver which enhances the secrecy aspects of a subscription system.

It is another object of the invention to provide a novel television receiver particularly constructed to utilize a received subscription television signal containing scrambled or coded video information during certain portions of reference time intervals and containing intelligible decoding information related to the code schedule of the subscription signal during other portions of such intervals.

One aspect of the invention comprehends a novel method of operating a subscription television receiver which includes an image-reproducing device and an adjustable decoding mechanism to effect image reproduction in response to a television signal received during a series of frame intervals representing successive image frames; the received television signal contains in portions of those intervals that represent a peripheral area of an image frame decoding information related to a predetermined adjustment of the decoding mechanism and contains in other portions of such frame intervals coded or scrambled video information. The method comprises initially applying the signal to the reproducing device to develop a composite image comprising a display of the decoding information and an unintelligible or scrambled display of the video information. Thereafter, the decoding mechanism is adjusted in accordance with this decoding information to decode or unscramble the signal as applied to the reproducing device. The final step consists in effectively obliterating the peripheral area of the reproduced composite image and the decoding information displayed therein, leaving only a display of the decoded or unscrambled video information.

The features of this invention which are believed to be new are set forth with particularity in the appended claims. The invention, together with further objects and advantages thereof, may best be understood, however, by reference to the following description in conjunction with the accompanying drawings, in which:

Figure 1:
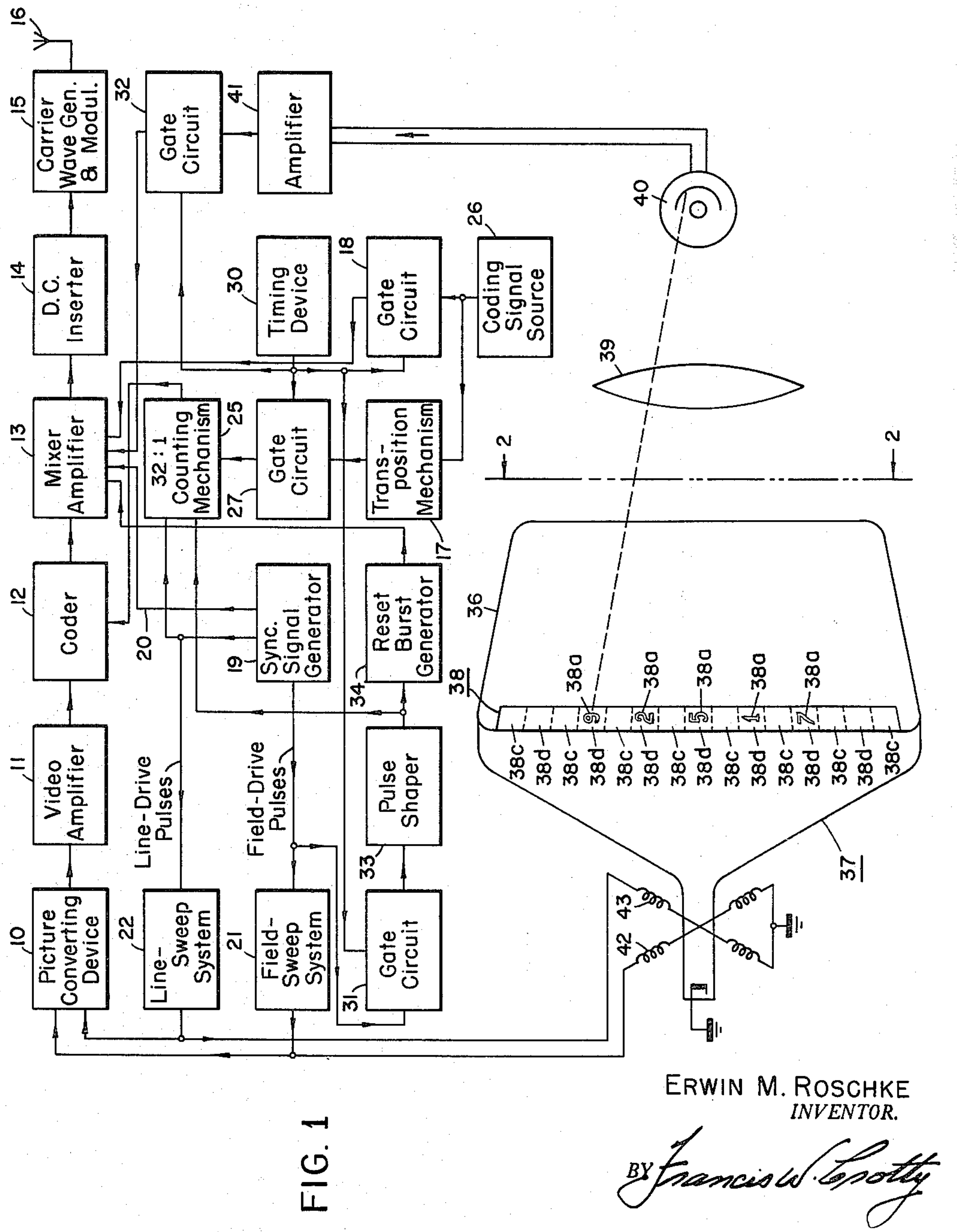
FIGURE 1 is a schematic representation of a subscription television transmitter.

The transmitter of FIGURE 1 includes a picture-converting device 10 which may be an iconoscope, image orthicon or other known device for developing a video signal representing an image to be televised. The output terminals of device 10 are connected through a video amplifier 11 and an encoding device or coder 12 to the input terminals of a mixer amplifier 13. Coder 12 may be similar to that disclosed and claimed in copending application Serial No. 243,039, filed August 22, 1951, and issued August 7, 1956, as Patent 2,728,153, in the name of Robert Adler, and assigned to the present assignee. Briefly, coder 12 may comprise a beam-deflection tube having a pair of output circuits which may be selectively coupled into the video channel as the electron beam thereof is deflected from one to another of two target anodes coupled to such output circuits. One of these circuits includes a time delay network so that the timing of the video components relative to the synchronizing components of the radiated television signal varies as the beam of the deflection tube is switched between its anodes. This swtiching effect is accomplished by a beam deflection-control or actuating signal applied to coder 12, as explained hereinafter. Such intermittent variations in the relative timing of the video and synchronizing components effectively codes the television signal since conventional television receivers, not equipped with suitable decoding devices, require a constant or invariable time relation between the video and synchronizing components to provide intelligible image reproduction.

More specifically, coder 12 has at least two stable operating conditions each of which imposes a different operating mode on the transmitter. In the first operating condition, coder 12 extends the video channel from amplifier 11 to mixer 13 without introducing any appreciable time delay, and in this condition the transmitter operation is conventional particularly in respect of the time relation between the video and synchronizing components of the radiated signal. In its second operating condition, the encoding device introduces a time delay in the video channel, and the transmitter then functions in an abnormal mode since the video and synchronizing components of the radiated signal have an abnormal time relation with respect to one another.

Mixer 13 is connected through a direct-current inserter 14 to a carrier-wave generator and modulator 15 which, in turn, is connected to an antenna 16. The transmitter also includes a synchronizing-signal generator 19 which supplies field- and line-synchronizing components and associated pedestal components to mixer amplifier 13 through suitable circuit connections here schematically represented as a single conductor 20. Generator 19 further supplies field- and line-drive pulses to a field-sweep system 21 and to a line-sweep system 22, respectively. The output terminals of sweep systems 21 and 22 are connected to the field- and line-deflection elements (not shown) associated with picture-converting device 10.

Synchronizing-signal generator 19 additionally supplies line-drive pulses to a counting mechanism 25 which may comprise a conventional 8:1 step-down blocking oscillator and two conventional bi-stable multivibrators, all three circuits connected in cascade, in order to exhibit a total 32:1 division rate with respect to the line-drive pulses applied to the input terminals and consequently to develop a square wave control signal having amplitude excursions occurring at every 16 line-trace intervals. A similar counting arrangement is shown in copending application Serial No. 370,174, Druz. The output terminals of counter 25 are connected to the deflection elements of coder 12 to supply a deflection-control signal thereto in order to effect actuation of coder 12 between its two operating conditions and code the television signal in accordance with the code schedule represented by the amplitude changes or excursions of the control signal.

A coding signal source 26 is provided which may comprise a code signal generator containing a series of individual signal generators for developing during each field-retrace interval a combination of code signal components or bursts each of which has a predetermined identifying characteristic such as frequency and collectively determining a code schedule in accordance with their appearance and order within the combination. A suitable code signal generator of this type is fully disclosed and claimed in copending application Serial No. 326,107, Bridges. The output terminals of the code generator are connected to mixer 13 through a normally open gate circuit 18 in order to add the code bursts to the composite video signal for concurrent radiation therewith.

Code signal source 26 is connected to counting mechanism 25 through a transposition mechanism 17 and a normally open gate circuit 27. Actually for the airborne coding information to be itself coded, it must distinguish from the code information applied to counter 25. For that purpose, it will be assumed that transposition mechanism 17 includes a multi-element switching mechanism from which the coding information or bursts of various signal frequencies are selectively taken for delivery to counter 25. And it will be further assumed that the multiple output of the transposition mechanism connect to the two multivibrators of counter 25 in he manner shown in the copending Druz application in order that the cyclic count may be interrupted in each field-retrace interval to increase the coding complexity.

In order to add to the composite video signal certain supplemental decoding or switch setting information, which is required by subscribers to completely attain the adjustment of their decoding mechanism corresponding to adjustment of the transposition mechanism 17, a timing device 30 is provided to produce an output signal pulse for a ten-second interval during each minute. This device, of course, may be conventional in construction. For example, it may comprise a synchronous motor, synchronized by field-drive pulses, which drives a cam through a reduction gearing such that the cam makes one complete revolution per minute. The cam may have an elevated switch actuating portion extending for sixty degrees of its periphery to actuate a pair of contacts during ⅙ of each revolution—or ten seconds out of each minute. Actuation of the contacts may then produce corresponding pulses, each consequently of ten second duration.

Timing device 30 has output terminals connected to second input circuits of normally open gate circuits 18 and 27 and to respective input circuits of two normally closed gate circuits 31 and 32. Gate circuit 31 has another input circuit connected to generator 19 in order to derive field-drive pulses therefrom and has an output circuit connected to a pulse shaper 33. The output terminals of shaper 33 are connected to another input circuit of counting mechanism 25 and to the input terminals of a reset burst generator 34. This generator, in turn, is connected to mixer amplifier 13.

Figure 2:
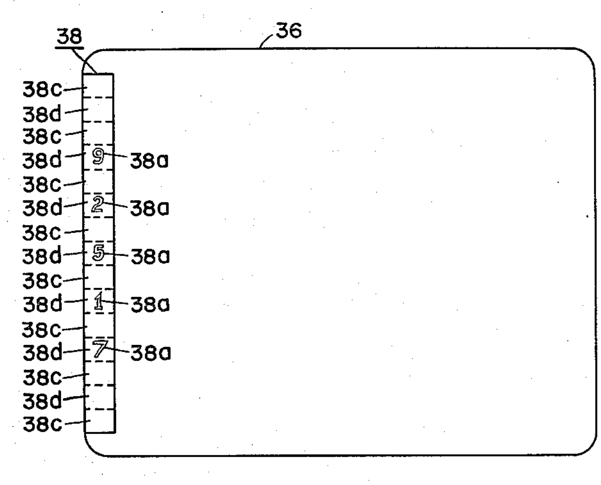
FIGURE 2 is another illustration or one or the components of FIGURE 1 viewed in the direction of arrows 2—2.

A cathode-ray tube 37, which may be of the "flying spot" scanner type, is provided and has a generally opaque screen, card or plate 38 positioned in front of its scanning area or face 36. The card is punched to define a combination of transparent areas representing five numbers 38*a* and is positioned at the extreme left hand side of face 36 looking into tube 37 in the direction illustrated by arrows 2—2, as shown in FIGURE 2, so that numbers 38*a* coincide with associated groups of successive line traces in an image frame.

It will be seen later that the particular combination of numbers on card 38, which is preferably unique to one given program, is conveyed to the subscribers during certain intervals of that program to inform subscribers of the final manner in which their decoding equipment must be set up to successfully decode the telecast. A first segment of information in the form of a first five-number combination representing a required partial setting of the transposition mechanism at each receiver, corresponding to mechanism 17 at the transmitter, may be initially distributed sometime before the program commences so that each subscriber may adjust his switches in accordance with this first combination. Each subscriber's transposition mechanism may include a series of five eighteen-position dial-type switches, each different pattern of dial settings effecting a different family of connections to the counting mechanism at the receiver corresponding to mechanism 25 at the transmitter. Each of the five switches may then be adjusted to a position corresponding to an assigned digit in the initial five-number combination.

The circuits established to the counting mechanism at each receiver do not yet, however, correspond to the circuits established to mechanism 25 at the transmitter. Each of the five switches must be further positioned in accordance with a second segment of information in the form of a second five-number combination in order to realize the same circuitry as at the transmitter. It is this second combination of numbers which may be represented by card 38 and conveyed to the subscribers at the beginning of and throughout each program. When this second combination is made known to each subscriber in a manner to be described, he may then further position his five switches in his transposition mechanism. This may be done by adding numerically the digits of the second combination to the dial settings corresponding to the first combination. Assume, for example, that the initial five number combination is 78361. If the second combination is then 92517 as represented by card 38 (assuming that it is read in conventional top-to-bottom manner), the final positions of the switches in each subscriber's transposition mechanism will be 7+9 or 16, 8+2 or 10, 3+5 or 8, 6+1 or 7, 1+7 or 8.

Returning now to card 38 in FIGURE 1, the grouping of the line traces is represented by dashed construction lines which define areas 38*c* and 38*d*. A condensing lens system 39 is positioned to focus upon a photo cell 40 the intensity modulated light projected through screen 38 from the fluorescent face of the "flying spot" cathode-ray tube 37, thereby to develop in the output of the photo cell a signal having a amplitude variations representing the indicia inscribed on card 38. This output signal is supplied to an amplifier 41 wherein it is amplified and supplied to another input circuit of normally-closed gate circuit 32.

The cathode-ray beam or "flying spot" of tube 37 is deflected in two directions normal to each other to form a two dimentional pattern of scanning lines, corresponding to the scanning pattern of picture-converting device 10, by means of a scanning system comprising line-scanning and field-scanning windings 42 and 43, respectively. Windings 43 and 42 are respectively connected to line-sweep system 22 and field-sweep system 21 in order to synchronize the operation of tube 37 with picture-converting device 10. Of course, the portion of the face plate of the flying spot scanner other than that occupied by card 38 is coated with or masked by an opaque shield (not shown) to prevent the generation of spurious signal components by photocell 40.

In order to simplify the detailed explanation of the operation of the transmitter of FIGURE 1, consideration will initially be given to the operation without regard to the effect of the coding circuitry. Picture converter 10 develops a video signal which represents the picture or image information to be televised. This signal is amplified in video amplifier 11, translated through coder 12, and applied to mixer amplifier 13 wherein it is combined with the usual line- and field-synchronizing and blanking pulses from synchronizing-signal generator 19. Mixer 13 develops a composite video signal which is applied to D.C. inserter 14 wherein it is adjusted as to proper background level. The adjusted video signal is then amplitude modulated on a picture carrier wave in unit 15, and the picture-modulated carrier wave is supplied to antenna 16 for transmission to the subscriber receivers. Sweep systems 21 and 22 are synchronized by the field- and line-drive pulses from generator 19 in a conventional manner. As in any television broadcast, the associated audio information is modulated on a sound carrier and concurrently radiated; the sound system may be entirely conventional or may include suitable sound coding apparatus.

Coding of the video portion of the broadcast is achieved by coder 12 under the influence of the deflection-control signal developed by counting mechanism 25 for switching the beam of the beam-deflection tube back and forth between its two segmental anodes in accordance with a secret code schedule represented by amplitude variations of the control signal. This actuation of the encoding device varies the operating mode of the transmitter by modifying the time relation between the video and synchronizing components of the radiated signal and achieves effective picture scrambling or coding. The deflection-control signal for coder 12 is developed from line-drive pulses applied by generator 19 to counting mechanism 25 wherein they are divided at a 32:1 ratio to produce a square-wave signal having amplitude excursions occurring at every 16 line-trace intervals. The square wave, as applied to coder 12 effects mode changes every 16 line traces. In order to interrupt this periodic mode changing pattern and increase the complexity of the coding schedule, a combination of code signal bursts is developed in source 26 during each field-retrace interval. After being subjected to a transposing or altering operation by means of switching mechanism 17, these bursts are effectively applied through normally-open gate circuit 27 to the various input circuits of the counting mechanism, specifically the input circuits of the two multivibrators thereof, in order to actuate mechanism 25 to different ones of its operating steps or conditions in the manner disclosed in complete detail in the copending application Serial No. 370,174, Druz.

The combinations of code bursts, without alteration or transposition, are preferably transmitted to subscriber receivers along with the composite video signal, as a modulation component. This is expedient inasmuch as the unaltered combinations themselves do not reveal the manner in which the counting mechanism is re-phased during field-retrace in response to the altered or transposed combination of code bursts. In the illustrated embodiment the unaltered code bursts are applied to mixer 13 through normally-open gate circuit 18 wherein they are added to the video signal during the field-retrace intervals in the manner of aforementioned copending application Serial No. 370,174, Druz.

In order to apprise the individual subscribers of the particular switch setting or transposing pattern employed in switch mechanism 17 so that in transposing the code burst combinations, corresponding transpositions of the received and unaltered code burst combinations may be made at the receivers, partial switch setting information is conveyed to the subscribers by mail, telephone, etc., prior to the beginning of a given program. This first segment of switch setting or decoding information, however, is not sufficient in itself. To supplement the first segment of switch setting information, additional information is added into the video signal from time to time for selective display on the picture tubes of subscriber receivers. This is achieved by developing a gating or triggering pulse in timing device 30 for a ten second duration during each minute. Normally-open gate circuits 18 and 27 are closed by this gating pulse to prevent translation of the code bursts from transposer 17 to counter 25 and from source 26 to mixer 13 during such ten second intervals. Each ten second pulse from timing device 30 also gates on or opens normally-closed gate circuit 31 to permit field-drive pulses to be applied to pulse shaper 33 wherein they are differentiated to provide relatively steep-sided pulses for application to the reset input circuit of counting mechanism 25.

Thus, instead of actuating counting mechanism 25 in a random manner during each field-retrace interval to establish it in a randomly selected operating condition or step, as is the case when code pulses from source 26 are translated by gate circuit 27, a reset pulse is developed during each field-retrace interval occurring within the pulse duration determined by timer 30 to reset the counter to a predetermined reference operating condition. Consequently, counting mechanism 25 is always placed in the same operating step or condition, namely the reference or zero-count condition, at the beginning of each field-trace interval during the ten-second intervals determined by timer 30.

Since the total counting ratio of counting mechanism 25 is 32, which is incommensurate with the number of horizontal scanning lines in a frame interval (namely, 525), the coded picture would, were it not for the resetting or actuating steps taken during each field-retrace interval, give the appearance or illusion of "walking" or "rolling" toward the top or bottom of the image screen on the picture tube of a subscriber's receiver which has not been adjusted properly to unscramble the image. This effect obtains whenever the number of operating steps in a cycle of the counter is not an even sub-multiple of the number of line intervals per frame and, consequently, the counter assumes a different operating condition at the beginning of successive frames so that mode changes do not occur at corresponding line traces of successive frames.

The resetting circuits intermittently gated in by timer 30 temporarily prevent the coded picture from "walking" or "rolling" in order to provide stationary "blank" areas in corresponding portions of each image frame in which to display an additional segment of decoding information at the receivers. The reset pulses developed in shaper 33 for resetting counter 25 must be made known to subscriber receivers and for that reason they are applied to generator 34 to produce signal bursts which are supplied to mixer 13 for transmission along with the composite video signal.

Figure 4:
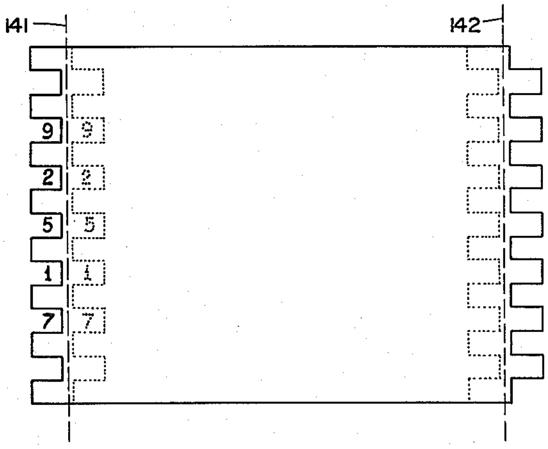
FIGURE 4 represents the image display developed on the picture tube of the receiver of FIGURE 3.

As the electron beam of cathode-ray tube 37 is deflected vertically and horizontally in synchronism with the corresponding deflections in picture converter 10, plate or screen 38 is scanned and the resulting intensity modulated light is focused by lens system 39 upon photo cell 40. When the mode changing pattern is stationary from frame to frame during the ten-second intervals determined by timing device 30, each successive group of 16 scanning lines is translated in a different operating mode, and corresponding 16-line groups of successive image frames represent transmission in the same operating mode. The dashed construction lines on card 38, defining areas **38*c* and 38*d*, correspond to and represent the mode changing times and the vertical distance between successive dashed lines represents 16 line-trace intervals. For convenience, it will be assumed that when the beam of cathode-ray tube 37 scans areas or sections 38*c* within the pulse interval established by timer 30, the system is conditioned in its "no delay" or normal mode, that is, there is no appreciable time delay introduced between the radiated line syncs and the video components. On the other hand, when the beam of tube 37 is scanning the interleaved areas 38*d* during any such interval coder 12 establishes the transmitter in its "delay" mode so that there is a predetermined time delay between the radiated line syncs and the picture components. This delayed mode operation which occurs during alternate groups of 16 line-trace intervals provides picture area "blanks" corresponding to vertically staggered horizontal edge portions of the scanning raster. The signal components developed by photo cell 40, representing the numbers 38*a* comprising the second segment of decoding information are superimposed on the coded composite video signal during time intervals corresponding to the picture area "blanks" of the coded scanning raster inasmuch as card 38 is positioned on the extreme left hand side of face 36 of tube 37 in such a manner that the numbers 38*a*** coincide with predetermined groups of line-trace intervals, as shown in FIGURE 2. The positioning of the switch setting information in the picture is also illustrated in FIGURE 4 which shows the display on the picture tube of a receiver. Each number of the illustrative combination 92517 is placed in a picture area "blank."

Of course, the cut-away numbers **38*a* on card 38 may be shifted from areas 38*d* to areas 38*c* and the entire card may be moved over to the right hand edge of face 36 in order to produce signal components representing these indicia during picture area "blanks" provided immediately subsequent to the groups of 16 line-trace intervals in the "no delay" or normal mode. As a still further alternative, the numbers 38*a*** may also be added across the extreme top or bottom of the image area.

The signal components representing the second segment of the decoding information are developed in photo cell 40, amplified in amplifier 41 and applied through normally-closed gate circuit 32, which is opened during each ten-second interval by timing device 30, to mixer amplifier 13 wherein they are combined with the composite video signal.

Figure 3:
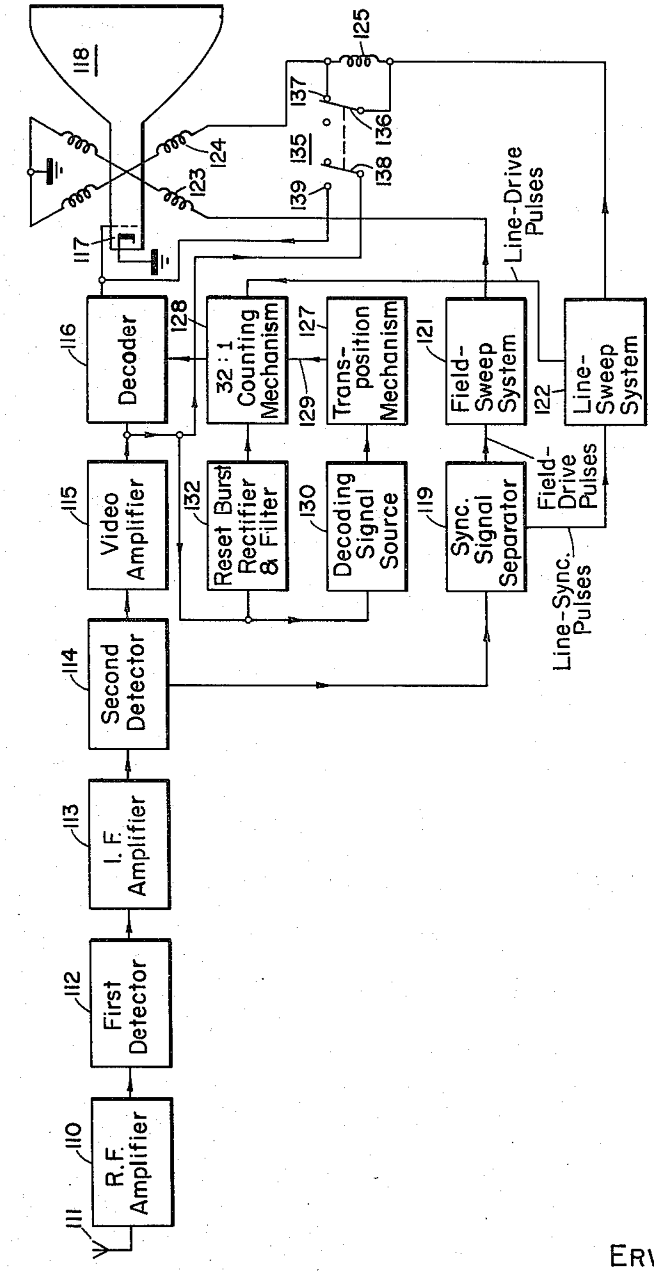
FIGURE 3 is a schematic representation of a subscription television receiver constructed in accordance with the invention for operation in conjunction with the transmitter of FIGURE 1.

The receiver of FIGURE 3 is constructed in accordance with the present invention to utilize the subscription telecast from the transmitter of FIGURE 1. It includes a radio-frequency amplifier 110 having input terminals connected to an antenna 111 and output terminals connected to a first detector 112. This detector is coupled through an intermediate-frequency amplifier 113 to a second detector 114 which, in turn, is connected to the input circuit of a video amplifier 115. The video amplifier is coupled through a decoder 116 to the input terminals 117 of a cathode-ray image-reproducing device 118. Decoder 116 may be similar to coder 12 at the transmitter but operated in a complementary fashion in order effectively to compensate for variations in the time relation between the video and line-synchronizing components of the received television signal. Complementary operation of the decoder may be assured by merely reversing the target anode connections of the beam-deflection tube as compared with the anode connections employed in the coder at the transmitter.

Second detector 114 is also connected to a synchronizing-signal separator 119 which has output circuits connected to a field-sweep system 121 and a line-sweep system 122. Field-sweep system 121 is connected to the field- or vertical-deflection elements 123 associated with reproducing device 118, and line-sweep system 122 is connected through an inductance coil 125 to the line- or horizontal-deflection elements 124 of image reproducer 118.

A 32:1 counting mechanism 128 is coupled to line-sweep system 122 to derive line-drive pulses therefrom, and the output terminals of counter 128 are coupled to the deflection elements of decoder 116. Counter 128 may be an exact counterpart of counter 25 at the transmitter and may also comprise an 8:1 blocking oscillator and two bi-stable multivibrators, all three connected in cascade. When counter 128 is operated in phase and synchronism with counter 25, decoder 116 effectively decodes the received video signal. A decoding signal source 130, which may comprise a series of filter-rectifier units, has its input circuit coupled to video amplifier 115 to filter out and rectify the code signal bursts which occur during field-retrace intervals and has its output terminals connected through a transposition mechanism 127 to various input circuits of counting mechanism 128, here schematically shown as one conductor 129. Transposition mechanism 127 is similar to unit 17 at the transmitter in that the code bursts of each combination are altered or transposed by means of switches before they are applied to the various input circuits of counter 128, as is also shown specifically in copending application Serial No. 370,174, Druz. The setting of switching mechanism 127 is made known only to authorized subscribers and partial information is supplied to the subscriber via the mails or other means sometime before the program commences. The second essential segment of the switch setting information, which is added to the composite video signal during the ten-second intervals out of each minute throughout the program, must also be known to the subscriber before he can set up the complete switch setting pattern.

A reset burst rectifier and filter 132 is coupled to the output circuit of video amplifier 115 to facilitate separation of the reset bursts from the composite television signal introduced by generator 34 at the transmitter during these ten-second intervals. A control switch 135 permits the subscriber to effectively remove the decoder from the video channel and also to decrease the width of the scanning raster or pattern, which is normally adjusted to slightly oversweep the face of picture tube 118, in order to reveal the decoding information contained in some of the horizontal edge portions of the image frames corresponding to picture area "blanks." Specifically, a first switch blade 136 is connected to one terminal of coil 125 to engage a stationary contact 137 in one of its two operating positions, namely its right-hand position. Contact 137 is connected to the other terminal of coil 125. A second switch blade 138 is connected to the output circuit of video amplifier 115 to engage a contact 139, which is connected to the output circuit of decoder 116, in one of its two operating positions, namely its left-hand position. Switch blades 136 and 138 are ganged for unicontrol operation as indicated by the dashed connecting line.

In the operation of the receiver of FIGURE 3, the coded television signal from the transmitter of FIGURE 1 is intercepted by antenna 111, amplified in radio-frequency amplifier 110, heterodyned to the selected intermediate frequency in first detector 112, amplified in intermediate-frequency amplifier 113 and detected in second detector 114 to produce a coded composite video signal. This latter signal is amplified in video amplifier 115 and translated through decoder 116 to input terminals 117 of image-reproducing device 118 to control the intensity of the electron beam in well known manner. The synchronizing components are separated in separator 119, the field-synchronizing components being utilized to synchronize the operation of sweep system 121 and consequently the vertical-deflection signal supplied to field-deflection elements 123, whereas the line-synchronizing pulses are utilized to synchronize sweep system 122 and therefore the horizontal-deflection signal supplied to elements 124. Switch 135 is normally positioned as shown and consequently coil 125 is short-circuited through switch blade 136 and contact 137 and has no effect on the amplitude of the horizontal-deflection signal. Of course, the sound-modulated carrier wave received along with the video carrier is detected and reproduced in an appropriate audio system which has been omitted from the drawings for purposes of simplicity.

Once transposition mechanism 127 is properly adjusted, decoding is accomplished in the identical manner explained hereinbefore in connection with the coding operation at the transmitter. Briefly, counter 128 operates in cyclic fashion in response to line-drive pulses applied from sweep system 122 to produce a square-wave deflection-control signal for decoder 116. During each field-retrace interval, decoding signal source 130 separates a combination of code signal bursts from the coded composite video signal, and switching mechanism 127 alters or transposes these bursts for application to the various input circuits of counting mechanism 128 in order to rephase it to any one of its operating steps in synchronism with the corresponding operation at the transmitter. Hence, the received coded telecast is decoded and reproduced for the enjoyment of the subscriber but this explanation has proceeded in the assumption that the subscriber's decoding mechanism has been properly adjusted to decode the particular program signal.

Assume now that the subscriber has not as yet set up his switching mechanism 127 and assume further that the program is starting. Switch 135 is in the position shown in FIGURE 3 and in this condition the horizontal scanning circuits oversweep picture tube 118. Consequently the staggered picture area "blanks" at the extreme horizontal edges are not displayed on the screen. This is graphically illustrated in FIGURE 4 which shows in solid outline the configuration of a scrambled picture raster, including the second segment of decoding information, during the ten-second intervals selected by timer 30 at the transmitter. It will be observed that the horizontal scanning lines are effectively divided into groups (16 lines in each group) and the successive groups are displaced laterally with respect to each other. With the line-sweep circuit normally adjusted to oversweep the picture tube only the video information contained between dashed lines 141 and 142 is displayed.

In order to render the second segment of switch setting information visible for use in setting up the transposition switches, control switch 135 is operated to its alternate or left-hand position. Decoder 116 is immediately removed from the circuit since it is short-circuited by switch blade 138. The operation of switch 135 also removes the short-circuit from coil 125, thereby functionally including this coil in series with the line-deflection elements 124. This has the effect of decreasing the amplitude of the line-deflection signal and narrowing the scanning raster in the horizontal direction. Consequently, the scanning area is decreased to the dotted outline between dashed lines 141 and 142 in FIGURE 4, revealing the supplemental or second segment of decoding information. The subscriber may then adjust his switching mechanism 127 in accordance with such information; these switch settings in conjunction with those corresponding to the first segment of decoding information distributed in advance condition the receiver to decode or unscramble the video signal. Switch 135 may then be thrown to its left hand position to widen the scanning raster and thus eliminate the decoding information from the decoded image reproduction. Thus, with the additional switch setting information for transposer 127 the decoder is properly adjusted so that when switch 135 is restored, decoder 116 is permitted to function to unscramble the picture and at one and the same time the horizonal sweep is expanded to move the marginal decoding information out of view.

Since this supplemental decoding information is transmitted along with the video signal during an entire program interval, a subscriber may tune in at any point throughout the program and be assured of obtaining this requisite additional material.

Reset burst rectifier and filter 132 isolates the reset signal component from the received program signal and supplies it to counter 128 to synchronize the operation of the subscriber receivers that have already been conditioned for proper decoding during the ten-second intervals that decoding information is present in the composite video signal. More particularly, reset pulses corresponding to those developed in shaper 33 at the transmitter at the beginning of each field retrace occurring in any such ten-second interval are duplicated by unit 132 at the receiver to effect a like reset of counter 128.

Figure 5:
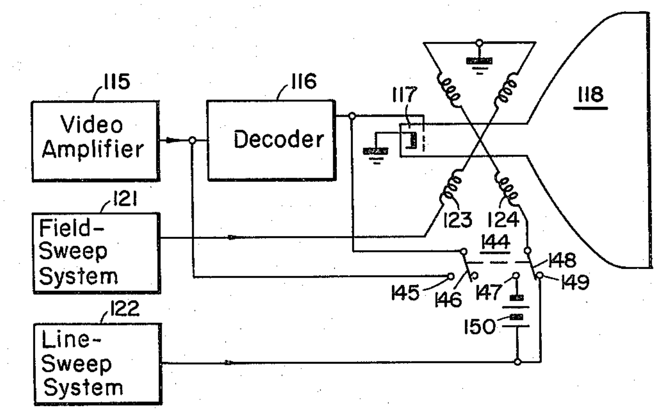
FIGURE 5 is a fragmentary block diagram of a modification of the receiver of FIGURE 3 in accordnace with another embodiment of the invention.

FIGURE 5 illustrates a modification of the receiver arrangement for bringing the switch setting information contained in the margin of the image frame into view and for subsequently obliterating that information without changing the width of the scanning raster. Components of this receiver corresponding to like components of the receiver of FIGURE 3 are identified by the same reference numerals. Instead of employing control switch 135 to functionally insert coil 125 in series with horizontal deflection coils 124 as in the arrangement of FIGURE 3, a control switch 144, which may also be of the double-pole double-throw type, is utilized to add a D.C. voltage to the horizontal deflection signal in order effectively to laterally move the entire scanning pattern on the face of the picture tube. More particularly, switch 144 has a movable blade 148 which is connected to horizontal deflection elements 124 and is adapted to selectively establish a connection to a stationary contact 149, which is connected directly to the output terminals of line-sweep system 122, or to a stationary contact 147 which is connected to one terminal of a unidirectional potential source such as a battery 150, the other terminal of which is connected to the output of line-sweep system 122. Switch 144 also has a movable blade 146 which is connected to the output of decoder 116 and is adapted to establish a connection to a stationary contact 145 which is connected to the input terminals of decoder 116. Blades 146 and 148 are ganged for unicontrol operation as shown by the dashed connecting line such that when the switch is thrown to the right-hand position, shown in FIGURE 5, blade 148 makes a connection with contact 149 and blade 146 effects no connection. On the other hand, when the control switch is thrown to its left-hand operating position, blade 148 establishes a connection with contact 147 and blade 146 makes a connection with contact 145.

Normally, control switch 144 is positioned as shown in FIGURE 5 and the image displayed is the same as that shown in FIGURE 4 in full line construction as is the case with normal operation of the receiver of FIGURE 3. The decoding or switch setting information would, of course, be outside of the viewing area. In order to bring this information into view, the subscriber operates switch 144 to the left, thereby short circuiting decoder 116, as is the case with the receiver of FIGURE 3. Voltage source 150 is also inserted in series with horizontal deflection coils 124 to superimpose a D.C. voltage on the horizontal deflection signal; with the proper polarity D.C. voltage this has the effect of moving the entire image on the picture tube to the right, so that the decoding information in the margin appears in the display area. After setting up the decoding mechanism, the subscriber may then position switch 144 back to its original position as shown in FIGURE 5 to reveal only the unscrambled or decoded video information.

In a system wherein at least a portion of the switch setting information is conveyed to a subscriber by means of a punch card, with each "punch" containing information for one program, such as is disclosed in copending application Serial No. 424,208, filed April 19, 1954, and issued November 12, 1957, as Patent 2,812,957, in the name of Pentti V. Sarlund, and assigned to the present assignee, the supplemental or second segment of decoding information displayed in a peripheral area of an image frame may indicate to the subscriber which area or "punch" is to be punched out for a particular program. He may then set up his switches according to the information revealed by the "punch."

By way of summary, the invention provides a novel method of operating a subscription television receiver, which includes an image-reproducing device 118 and an adjustable decoding mechanism (source 130, transposition mechanism 127, counter 128 and decoder 116) to effect image reproduction in response to a television signal received during a series of frame intervals representing successive image frames and containing in portions of those intervals that represent a peripheral area (for example, staggered picture area "blanks" in the left-hand margin) of an image frame decoding information related to a predetermined adjustment of the decoding mechanism and containing in other portions of such frame intervals coded or scrambled video information. The method of the present invention comprises initially the step of applying the signal to reproducing device 118 to develop a composite image comprising a display of the decoding information and an unintelligible or scrambled display of the video information. This composite display is revealed when switch 135 is thrown to its left-hand operating position. Thereafter, the decoding mechanism, specifically the portion thereof that includes transposer 127, is adjusted in accordance with the decoding information revealed by the composite image to decode or unscramble the signal as applied to the image reproducer. Finally, the peripheral area of the reproduced composite image is effectively obliterated by operating switch 135 to its right-hand position, leaving only a display of the decoded or unscrambled video information.

While particular embodiments of the invention have been shown and described, modifications may be made, and it is intended in the appended claims to cover all such modifications as may fall within the true spirit and scope of the invention.

I claim:

1. The method of operating a subscription television receiver including an image-reproducing apparatus and an adjustable decoding mechanism to effect an image display in response to a television signal received during a series of frame intervals representing successive image frames and containing, in portions of those intervals that represent a peripheral area of an image frame, decoding information related to a predetermined adjustment of said decoding mechanism and containing in other portions of such frame intervals coded video information, said method comprising the steps of: developing in said reproducing apparatus from said television signal a composite image comprising a display of said decoding information and an unintelligible display of said video information; thereafter, adjusting said decoding mechanism in accordance with said decoding information to decode said signal as applied to said reproducing apparatus; and effectively obliterating said peripheral area of the reproduced composite image, leaving only a display of the decoded video information.

2. The method of operating a subscription television receiver including an image-reproducing apparatus and an adjustable decoding mechanism to effect an image display in response to a television signal received during a series of frame intervals representing successive image frames and containing, in portions of those intervals that represent a peripheral area of an image frame, decoding information related to a predetermined adjustment of said decoding mechanism and containing in other portions of such frame intervals coded video information, said method comprising the steps of: developing in said reproducing apparatus from said television signal a composite image comprising a display of said decoding information and an unintelligible display of said video information; thereafter, adjusting said decoding mechanism in accordance with said decoding information to decode said signal as applied to said reproducing apparatus; and expanding the scanning pattern of said reproducing apparatus effectively to obliterate said peripheral area of the reproduced composite image, leaving only a display of the decoded video information.

3. The method of operating a subscription television receiver including an image-reproducing apparatus and an adjustable decoding mechanism to effect an image display in response to a television signal received during a series of frame intervals individually including a plurality of line-trace intervals and containing, in portions of those line-trace intervals that represent a marginal area of an image frame, decoding information related to a predetermined adjustment of said decoding mechanism and containing in other portions of such line-trace intervals coded video information, said method comprising the steps of: applying said signal to said reproducing apparatus; adjusting the scanning pattern of said reproducing apparatus to develop a composite image comprising a display of said decoding information and an unintelligible display of said video information; thereafter, adjusting said decoding mechanism in accordance with said decoding information to decode said signal as applied to said reproducing apparatus; and widening the scanning pattern of said reproducing apparatus effectively to obliterate said marginal area of the reproduced composite image, leaving only a display of the decoded video information.

4. The method of operating a subscription television receiver including an image-reproducing apparatus and an adjustable decoding mechanism to effect an image display in response to a television signal received during a series of frame intervals representing successive image frames and containing, in portions of those intervals that represent a peripheral area of an image frame, decoding information related to a predetermined adjustment of said decoding mechanism and containing in other portions of such frame intervals coded video information, said method comprising the steps of: developing in said reproducing apparatus from said television signal a composite image comprising a display of said decoding information and an unintelligible display of said video information; thereafter, adjusting said decoding mechanism in accordance with said decoding information to decode said signal as applied to said reproducing apparatus; and laterally shifting the scanning pattern of said reproducing device effectively to obliterate said peripheral area of the reproduced composite image, leaving only a display of the decoded video information.

5. A subscription television receiver for utilizing a television signal received during a series of frame intervals representing successive image frames and containing decoding information in portions of those intervals that represent a peripheral area of an image frame and containing coded video information in other portions of such frame intervals, said receiver comprising: image-reproducing apparatus having a viewing screen; an adjustable decoding mechanism; means for supplying said television signal to said image-reproducing apparatus through at least part of said decoding mechanism to develop only an unintelligible display of said video information on said viewing screen; and unicontrol means coupled to said decoding mechanism and to said image-reproducing apparatus for bypassing said mechanism and for developing a composite display of both said unintelligible video information and said decoding information in order that said adjustable decoding mechanism may be adjusted in accordance with said decoding information to effect decoding of the video information.

6. A subscription television receiver for utilizing a television signal received during a series of frame intervals representing successive image frames and containing decoding information in portions of those intervals that represent a peripheral area of an image frame and containing coded video information in other portions of such frame intervals, said receiver comprising: an image-reproducing device having a viewing screen; an adjustable decoding mechanism; means for supplying said television signal to said image-reproducing device through at least part of said decoding mechanism; a sweep system for said reproducing device normally oversweeping said viewing screen effectively to reproduce only said coded video information on said screen; and a unicontrol mechanism coupled to said decoding mechanism and to said sweep system for by-passing said decoding mechanism and for compressing the sweep effectively to develop a composite display of both said coded video information and said decoding information in order that said adjustable decoding mechanism may be adjusted in accordance with said decoding information to effect decoding of the video information.

7. A subscription television transmitter comprising: means for developing a television signal including video information during a series of frame intervals representing successive image frames; an adjustable coding mechanism coupled to said television-signal-developing means for effectively coding said video information in accordance with a code schedule determined by the instantaneous adjustment of said coding mechanism; means including an auxiliary scanning device coupled to said television-signal developing-means and operated in synchronism therewith for producing code signal components representing decoding information at least partially indicating said instantaneous adjustment of said coding mechanism; means for combining said decoding information with said coded video information such that said decoding information is contained in portions of said frame intervals that represent a peripheral area of an image frame; and means for transmitting the combined decoding and coded video information to subscriber receivers.

8. A subscription television system including a transmitter and a receiver comprising: means for developing a television signal in said transmitter including video information during a series of frame intervals representing successive image frames; an adjustable coding mechanism coupled to said television-signal-developing means for effectively coding said video information in accordance with a code schedule determined by the instantaneous adjustment of said coding mechanism; means for producing code signal components representing decoding information related to said instantaneous adjustment of said coding mechanism; means for combining said decoding information with said coded video information such that said decoding information is contained in portions of said frame intervals that represent a peripheral area of an image frame; means for transmitting the combined decoding and coded video information to said receiver; image-reproducing apparatus having a viewing screen in said receiver; an adjustable decoding mechanism in said receiver; means for supplying the combined decoding and coded video information from said transmitter to said reproducing apparatus through at least part of said decoding mechanism to develop only an unintelligible display of said video information on said viewing screen; and unicontrol means coupled to said decoding mechanism and to said image-reproducing apparatus for rendering said decoding mechanism ineffective and for developing a composite display of both said coded video information and said decoding information in order that said adjustable decoding mechanism may be adjusted in accordance with said decoding information to effect decoding of the video information.

9. A subscription television transmitter comprising: means for developing a television signal including video information during a series of frame intervals representing successive image frames; an adjustable coding mechanism coupled to said television-signal-developing means for effectively coding said video information in accordance with a code schedule determined by the instantaneous adjustment of said coding mechanism; means for producing code signal components representing decoding information at least partially indicating said instantaneous adjustment of said coding mechanism; means for combining said decoding information with said coded video information such that said decoding information is contained in portions of said frame intervals that represent a peripheral area of an image frame; and means for transmitting the combined decoding and coded video information to subscriber receivers.

References Cited in the file of this patent

UNITED STATES PATENTS

| | | |
|---|---|---|
| 2,402,058 | Loughren | June 11, 1946 |
| 2,601,505 | Ellett | June 24, 1952 |
| 2,619,530 | Roschke | Nov. 25, 1952 |
| 2,636,936 | Goldsmith | Apr. 28, 1953 |
| 2,843,656 | Morris | July 15, 1958 |

OTHER REFERENCES

Journal of the S.M.P.T.E., August 1953, vol. 61, pages 183 to 194.